(12) United States Patent
Hong

(10) Patent No.: US 11,539,201 B2
(45) Date of Patent: Dec. 27, 2022

(54) REVERSE POLARITY PROTECTION DEVICE

(71) Applicant: PORTWELL INC., New Taipei (TW)

(72) Inventor: Jhih-Huei Hong, New Taipei (TW)

(73) Assignee: PORTWELL INC., New Taipei (TW)

( * ) Notice: Subject to any disclaimer, the term of this patent is extended or adjusted under 35 U.S.C. 154(b) by 0 days.

(21) Appl. No.: 17/208,403

(22) Filed: Mar. 22, 2021

(65) Prior Publication Data

US 2021/0210944 A1 Jul. 8, 2021

Related U.S. Application Data

(63) Continuation-in-part of application No. 16/547,018, filed on Aug. 21, 2019, now abandoned.

(30) Foreign Application Priority Data

Mar. 4, 2019 (TW) ................................. 108202580

(51) Int. Cl.
| | | |
|---|---|---|
| *H02H 3/00* | (2006.01) | |
| *H02H 1/00* | (2006.01) | |
| *H02H 3/18* | (2006.01) | |
| *H02H 7/12* | (2006.01) | |

(52) U.S. Cl.
CPC .......... *H02H 3/003* (2013.01); *H02H 1/0007* (2013.01); *H02H 3/18* (2013.01); *H02H 7/1213* (2013.01)

(58) Field of Classification Search
CPC ........ H02H 3/18; H02H 7/1213; H02H 3/003; H02H 1/0007; H02M 1/32; H02M 3/156
See application file for complete search history.

(56) References Cited

U.S. PATENT DOCUMENTS

| | | | | |
|---|---|---|---|---|
| 4,653,084 A | * | 3/1987 | Ahuja | .................. H04M 3/301 |
| | | | | 379/27.06 |
| 5,654,859 A | * | 8/1997 | Shi | ........................... H02J 9/00 |
| | | | | 361/100 |
| 6,501,196 B1 | * | 12/2002 | Lo | ............................ H02J 9/06 |
| | | | | 307/64 |

(Continued)

FOREIGN PATENT DOCUMENTS

TW        M325665 U        1/2008

*Primary Examiner* — Yusef A Ahmed
(74) *Attorney, Agent, or Firm* — Muncy, Geissler, Olds & Lowe, P.C.

(57) ABSTRACT

A reverse polarity protection device includes a protection unit, a detection unit, and a control unit electrically connected between a power supply device and a load device. The detection unit is electrically connected to the power supply device for detecting the polarity of an output signal of the power supply device, and the control unit is electrically connected to the detection unit and the protection unit. The detection unit outputs a detection signal to the control unit according to a detection result of the polarity of the output signal. If the detection signal shows that the polarity of the output signal is reverse, the control unit will control the protection unit to form an open circuit between the power supply device and load device to stop transmitting the output signal of the power supply device to the load device and achieve a reverse polarity protection effect of the load device.

7 Claims, 5 Drawing Sheets

(56) References Cited

U.S. PATENT DOCUMENTS

| | | | |
|---|---|---|---|
| 6,611,410 B1* | 8/2003 | Makaran | H02J 7/0034 361/84 |
| 7,012,793 B2 | 3/2006 | Cheevanantachai et al. | |
| 7,379,282 B1* | 5/2008 | Zansky | H03K 17/76 361/18 |
| 9,419,618 B1* | 8/2016 | Zheng | H03K 19/01855 |
| 9,448,578 B1* | 9/2016 | Deng | G05F 3/02 |
| 9,948,088 B2* | 4/2018 | Held | H02H 3/18 |
| 10,483,757 B1* | 11/2019 | Banak | H02H 9/041 |
| 10,985,548 B2* | 4/2021 | Telefus | H02H 3/105 |
| 2004/0109272 A1 | 6/2004 | Cheevanantachai | |
| 2004/0164785 A1 | 8/2004 | Metzler | |
| 2007/0001255 A1* | 1/2007 | Lin | G01L 1/225 257/467 |
| 2007/0035899 A1* | 2/2007 | Covi | H02M 3/1584 361/56 |
| 2008/0247108 A1* | 10/2008 | Ando | H02H 7/0833 361/84 |
| 2009/0310270 A1* | 12/2009 | Burns | H02H 3/066 361/90 |
| 2013/0029527 A1* | 1/2013 | Mullins | H01R 24/60 439/620.21 |
| 2013/0188287 A1* | 7/2013 | Imura | H02H 3/18 361/56 |
| 2013/0193754 A1* | 8/2013 | Sugiyama | B60L 58/10 307/10.7 |
| 2013/0242444 A1* | 9/2013 | Zick | H02H 3/003 361/84 |
| 2014/0029146 A1* | 1/2014 | Pavlin | H01L 27/0251 361/84 |
| 2015/0349514 A1* | 12/2015 | Chen | H02H 11/006 361/84 |
| 2016/0301235 A1* | 10/2016 | Okanoue | H02J 7/007184 |
| 2017/0040999 A1 | 2/2017 | Schneider | |
| 2017/0194120 A1* | 7/2017 | Lei | B60R 16/03 |
| 2017/0373505 A1* | 12/2017 | Luo | H02J 4/00 |
| 2018/0048142 A1* | 2/2018 | Immel | B60R 16/03 |
| 2018/0157608 A1* | 6/2018 | Wan | G06F 13/404 |
| 2019/0027945 A1* | 1/2019 | Gagnon | H02H 11/003 |
| 2019/0109479 A1* | 4/2019 | Tsujioka | H02J 1/00 |
| 2019/0260198 A1* | 8/2019 | Sonehara | B60R 16/02 |
| 2019/0369167 A1* | 12/2019 | Bhat | G01R 31/40 |
| 2020/0067301 A1* | 2/2020 | Boros | H02H 3/105 |
| 2020/0076190 A1* | 3/2020 | La Rosa | G05F 3/205 |
| 2020/0106259 A1* | 4/2020 | Telefus | H02H 3/08 |
| 2020/0106260 A1* | 4/2020 | Telefus | H02H 3/10 |
| 2020/0235569 A1* | 7/2020 | Yin | G06F 13/4068 |
| 2020/0259327 A1* | 8/2020 | Fahlbusch | H02H 3/18 |
| 2020/0366079 A1* | 11/2020 | Telefus | G01R 31/52 |
| 2021/0119528 A1* | 4/2021 | Telefus | H02M 1/08 |

* cited by examiner

US 11,539,201 B2

REVERSE POLARITY PROTECTION DEVICE

CROSS REFERENCE TO RELATED APPLICATIONS

This application is a Continuation-in-Part of co-pending application Ser. No. 16/547,018, filed on Aug. 21, 2019, for which priority is claimed under 35 U.S.C. § 120; and this application claims priority of Application No. 108202580 filed in TAIWAN on Mar. 4, 2019 under 35 U.S.C. § 119; the entire contents of all of which are hereby incorporated by reference.

FIELD OF THE INVENTION

The present invention relates to the field of power input protection, and more particularly to a power supply device and a reverse polarity protection device installed between the power supply device and its load device.

BACKGROUND OF THE INVENTION

As Internet of Things, AI big data analysis and cloud storage are used extensively, server systems and data centers tend to be built with a modular design to facilitate engineers to adjust electronic devices such as network units and/or storage units contained in the server systems and data centers. In addition, power supply systems also come with the modular design, so that the server systems and/or data centers located at different cabinets can obtain electric power. In general, power supply terminals inside a power supply module in the server systems and data center have a foolproof design to prevent assemblers to connect the positive and negative terminals reversely during an assembling process of the power supply modules and mainboards. However, the power supply module used together with an external power supply device to achieve the effect of electrically connecting an external power supply terminal generally adopts a conventional power supply terminal. Obviously, it is difficult to add the foolproof design to the conventional power supply terminal.

At present, diodes used as the reverse polarity protection components are generally installed between a power input terminal and a power supply module of an integrated circuit (IC) and the characteristics of forward conduction and reverse cutoff are used to achieve the reverse polarity protection of the integrated circuit. However, the power consumption and heat generation of the forwardly conducted diode become the issues of a circuit module in the applications of a large-power power supply module and lead to the result of the diode that can be used in the small-power large-voltage power supply module only. For example, some data centers having a 12V/200 W power supply module and the diode cannot be used in these data centers to provide the reverse polarity protection function.

In view of the aforementioned problem, R.O.C. Pat. No. M325665 discloses a foolproof circuit structure. With reference to FIG. 1 for a schematic circuit block diagram of the foolproof circuit structure as disclosed in R.O.C. Pat. No. M325665, the foolproof circuit structure 1' is coupled between a DC power supply 2' and a load device 3'. According to the content disclosed in R.O.C. Pat. No. M325665, the foolproof circuit structure 1' is an N-type Metal-Oxide-Semiconductor Field-Effect Transistor (N-type MOSFET) or a P-type MOSFET, and the P-type MOSFET has a drain, a source and a gate coupled to the DC power supply 2', the load device 3' and a common ground GND' respectively.

The foolproof circuit structure 1' can indeed provide the reverse polarity protection to the load device 3'. However, it is noteworthy that if only the MOSFET is used for protection and one of the power supplies in a DC power supply 2' is abnormal, then the other power supplies will be affected, and the whole system will become unstable.

Therefore, it is necessary to develop a reverse polarity protection component or device that can be applied in a small-power large-voltage circuit. Based on the aforementioned reasons, the inventor of the present invention based on years of experience in the related industry to conduct extensive research and experiment, and finally developed a reverse polarity protection device of the present invention to overcome the aforementioned drawbacks of the prior art.

SUMMARY OF THE INVENTION

Therefore, it is a primary objective of the present invention to provide a reverse polarity protection device, comprising: a protection unit, a detection unit, and a control unit electrically coupled between a power supply device and a load device, wherein the detection unit is electrically coupled to the power supply device for detecting the polarity of an output signal of the power supply device, and the control unit is electrically coupled to the detection unit and the protection unit. According to the design of the present invention, the detection unit is provided for outputting a detection signal to the control unit according to the detection result of the polarity of the output signal. For example, the control unit will control the protection unit to form an open circuit between the power supply device and the load device if the detection signal shows that the polarity of the output signal is reverse, and this method blocks and prevents the output signal of the power supply device from being transmitted to the load device to achieve a reverse polarity protection of the load device.

To achieve the aforementioned objective, the present invention provides a reverse polarity protection device, comprising:

a protection unit, electrically coupled between a power supply device and a load device;

a detection unit, electrically coupled to the power supply device, for detecting the polarity of an output signal of the power supply device; and a control unit, electrically coupled to the detection unit and the protection unit;

wherein, if the detection unit detects that the polarity of the output signal is reverse, then the control unit will control the protection unit to form an open circuit between the power supply device and the load device.

In an embodiment of the reverse polarity protection device, the protection unit is an N-type MOSFET or a P-type MOSFET.

In an embodiment of the reverse polarity protection device, the output signal is a voltage signal or a current signal.

In an embodiment of the reverse polarity protection device, the load device is one selected from the group consisting of an industrial computer host, a server, a data center host, a desktop computer, a notebook computer, a tablet PC, a smartphone, and a smartwatch.

In an embodiment of the reverse polarity protection device, A reverse polarity protection device, comprising: at least two a protection units, each protection unit is electrically coupled between a power supply device and a load device corresponding to the protection unit; the power supply device outputs a plurality of output signals respectively to each load device corresponding to each protection unit; a detection unit, electrically coupled to the power supply device, for detecting the polarity of each output signal of the power supply device; and a control unit, electrically coupled to the detection unit and each protection unit; wherein if the detection unit detects that the polarity of any output signal is reverse, the control unit will control the protection unit corresponding to the reverse output signal to form an open circuit between the power supply device and the load device corresponding to the reverse output signal.

herein each protection unit comprises an n-type MOSFET having a source terminal for receiving the output signal corresponding to the protection unit, and a drain terminal and a gate terminal respectively and electrically coupled to the load device corresponding to the protection unit and the control unit.

wherein each N-type MOSFET has a source terminal and a drain terminal electrically coupled to the control unit.

wherein each protection unit comprises a P-type MOSFET having a source terminal for receiving the output signal corresponding to the protection unit, and a drain terminal and a gate terminal respectively and electrically coupled to the load device corresponding to the protection unit and the control unit.

wherein each P-type MOSFET has a source terminal and a drain terminal electrically coupled to the control unit.

wherein when the detection unit detects the polarity of each output signal of the power supply device, the detection unit outputs a detection signal corresponding to a output signal to the control unit, so that if any detection signal corresponding to the protection unit is a low level signal then the control unit will control the protection unit corresponding to the low level signal to form a short circuit between the power supply device and the load device corresponding to the low level signal, and if any detection signal corresponding to the protection unit is a high level signal then the control unit will control the protection unit corresponding to the high level signal to form an open circuit between the power supply device and the load device corresponding to the high level signal.

wherein when the detection unit detects the polarity of each output signal of the power supply device, the detection unit outputs a detection signal corresponding to a output signal to the control unit, so that if any detection signal corresponding to the protection unit is a high level signal then the control unit will control the protection unit corresponding to the high level signal to form a short circuit between the power supply device and the load device corresponding to the high level signal, and if any detection signal corresponding to the protection unit is a high low signal then the control unit will control the protection unit corresponding to the low level signal to form an open circuit between the power supply device and the load device corresponding to the low level signal.

wherein each output signal is a voltage signal or a current signal.

wherein each load device is one selected from the group consisting of an industrial computer host, a server, a data center host, a desktop computer, a notebook computer, a tablet PC, a smartphone, and a smartwatch.

The present invention will become clearer in light of the following detailed description of an illustrative embodiment of this invention described in connection with the drawings.

DESCRIPTION OF THE PREFERRED EMBODIMENTS

Figure 1:
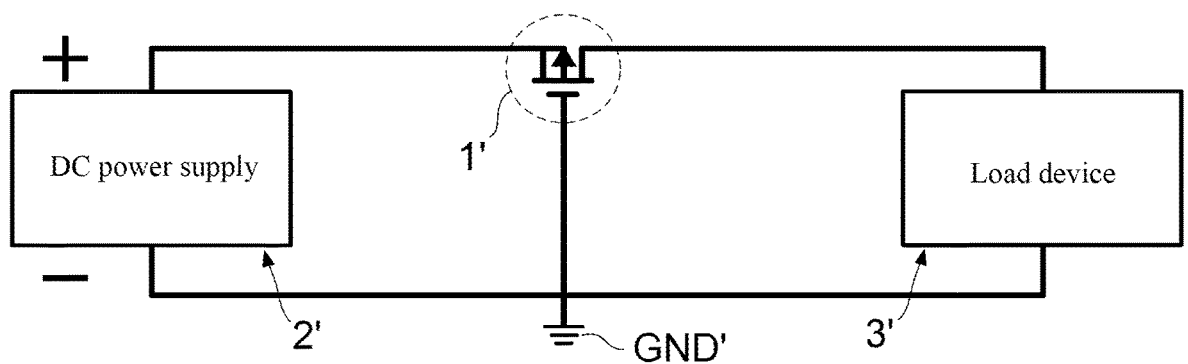
FIG. 1 is a schematic circuit block diagram of a foolproof circuit structure as disclosed in R.O.C. Pat. No. M325665.
Figure 2:
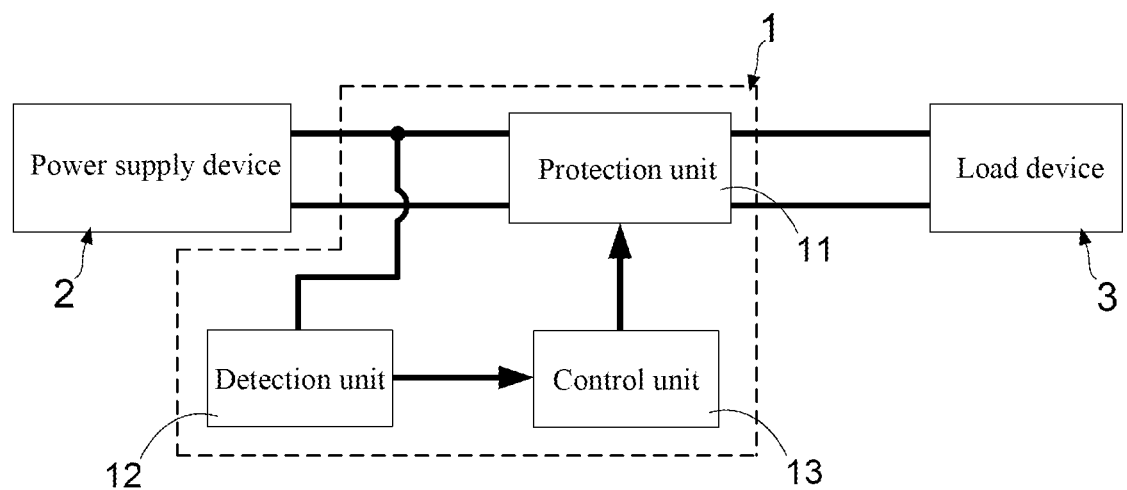
FIG. 2 is a schematic circuit block diagram of a reverse polarity protection device of the present invention.
Figure 3:
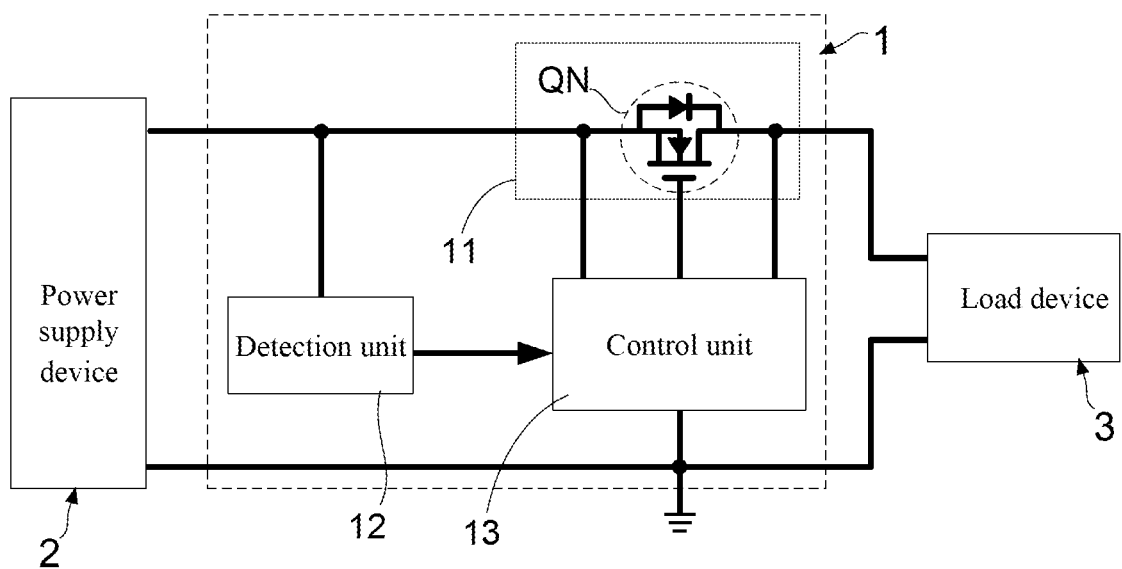
FIG. 3 is a schematic circuit diagram of a reverse polarity protection device of the present invention.

With reference to FIGS. 2 and 3 for a schematic circuit block diagram and a schematic circuit diagram of a reverse polarity protection device of the present invention respectively, the reverse polarity protection device 1 installed on a circuit comprises a protection unit 11, a detection unit 12 and a control unit 13. Wherein, the protection unit 11 is electrically coupled between a power supply device 2 and a load device 3, and the detection unit 12 is electrically coupled to the power supply device 2 for detecting the polarity of an output signal of the power supply device 2. On the other hand, the control unit 13 is electrically coupled to the detection unit 12 and the protection unit 11. In the present invention, the protection unit 11 comprises an N-type Metal-Oxide-Semiconductor Field-Effect Transistor (N-type MOSFET) QN. In FIG. 3, the N-type MOSFET QN has a source terminal (S) provided for receiving the output signal of the power supply device 2, and the N-type MOSFET QN has a drain terminal (D) and a gate terminal (G) respectively and electrically coupled to the load device 3 and the control unit 13. In addition, the N-type MOSFET QN has a source terminal (S) and a drain terminal (D) respectively and electrically coupled to the control unit 13. The control unit 13 also can self-detect the polarity of the output signal. For example, the control unit 13 compares an electric potential output signal of the source terminal (S) of the N-type MOSFET QN with the electric potential of a common ground to determine the polarity of the output signal. If the polarity of the output signal is correct, then the control unit 13 will drive the N-type MOSFET QN to form a short circuit between the power supply device 2 and the load device 3.

However, the power supply device 2 in a data center generally includes a multiple power output and OR-ing power structure (or a redundant power supply). To prevent the situation that if one of the power supply devices 2 is abnormal, then other power supplies will be affected, the present invention uses the detection unit 12 to notice the control unit 13 to turn on/off the N-type MOSFET QN.

Figure 4:
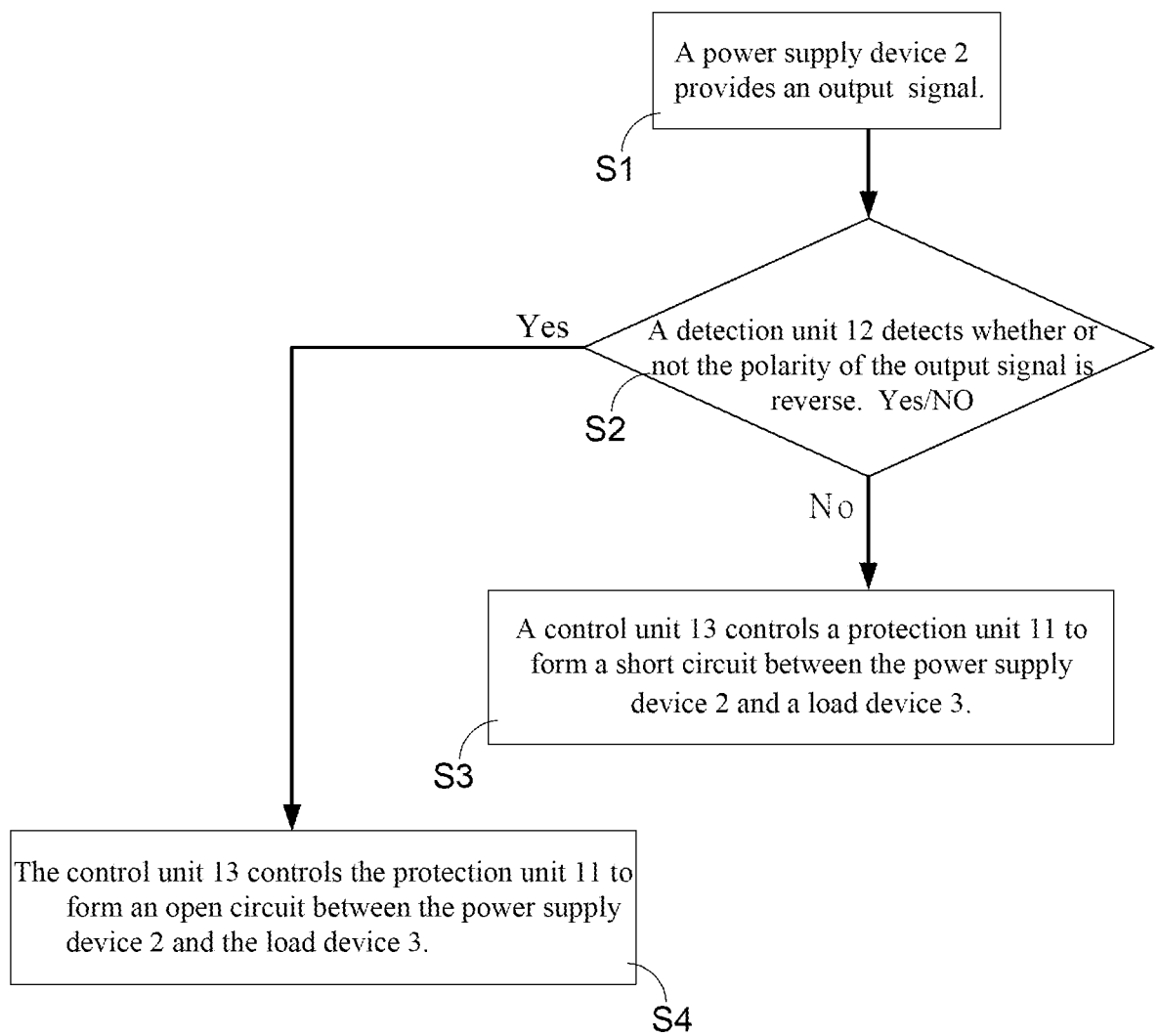
FIG. 4 is a flow chart of a method of operating a detection unit and a control unit in accordance with the present invention.

According to the detection result of the polarity of the output signal, the detection unit 12 outputs a detection signal to the control unit 13 to drive the control unit 13 to turn on/off the N-type MOSFET QN. With reference to FIG. 4 for a flow chart of an operating method of a detection unit and a control unit in accordance with the present invention, after the power supply device 2 provides the output signal (step S1), if the detection unit 12 detects that the polarity of the output signal is normal (step S2), then the detection unit 12 will output the detection signal as a low level signal. The so-called normal polarity of the output signal refers to a potential of the output signal greater than zero. For example, if the output signal is a positive voltage signal or a positive current signal, then the detection unit 12 will compare the output signal with the electric potential of a common ground to determine that the potential level is greater than zero. In the step S3, the control unit 13 will turn on the N-type MOSFET QN if the detection signal is a low level signal, so that the protection unit 11 will form a short circuit between the power supply device 2 and the load device 3, and the output signal of the power supply device 2 will be transmitted to the load device 3.

On the contrary, if the detection result shows that the polarity of the output signal is reverse (step S2), the detection unit 12 will output the detection signal as a high level signal. In the step S4, the control unit 13 will turn off the N-type MOSFET QN if the detection signal is a high level signal, so that the protection unit 11 will form an open circuit between the power supply device 2 and the load device 3 to block and prevent the output signal of the power supply device 2 from being transmitted to the load device 3 continuously, so as to achieve a reverse polarity protection of the load device 3. It must be emphasized that the detection unit 12 will output a low level signal or a high level signal if the polarity of the output signal is normal or reverse respectively. It is noteworthy that it is not difficult for related engineers to design the detection unit 12 to output a high level signal or a low level signal when the polarity of the output signal is normal or reverse respectively.

Briefly, if one of the power supplies is abnormal or the polarity of the output signal is reverse, then the detection unit 12 will notice the control unit 13 directly to turn off the N-type MOSFET QN. Therefore, the design of the detection unit 12 provides an additional security mechanism. Even if one of the power outputs of the power supply device 2 is abnormal, the other power output will not be affected. It is noteworthy that the present invention is not limited to the load device 3 of this embodiment only, but any electronic device or electrical apparatus that requires an external power supply device such as an industrial computer host, a server, a data center host, a desktop computer, a notebook computer, a tablet PC, a smartphone, or a smartwatch may be used instead. On the other hand, the protection unit 11, the detection unit 12 and the control unit 13 may be integrated into an integrated circuit (IC) in an application.

Figure 5:
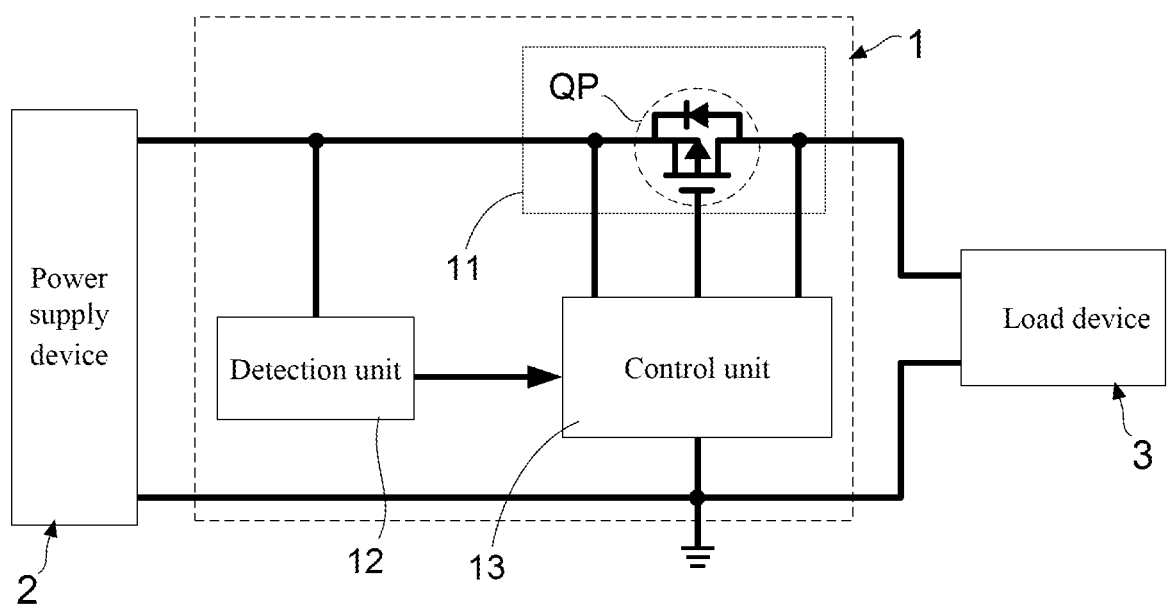
FIG. 5 is a schematic circuit diagram of a reverse polarity protection device of the present invention.

Although FIG. 3 shows that the protection unit 11 includes an n-type MOSFET QN, yet the invention is not limited to the circuit of the protection unit 11 only. With reference to FIG. 5 for a schematic circuit diagram of a reverse polarity protection device of the present invention, the protection unit 11 may comprise a P-type MOSFET QP having a source terminal (S) for receiving the output signal of the power supply device 2, and a drain terminal (D) and a gate terminal (G) respectively and electrically coupled to the load device 3 and the control unit 13. In addition, the P-type MOSFET QN has a source terminal (S) and a drain terminal (D) electrically coupled to the control unit 13.

Figure 6:
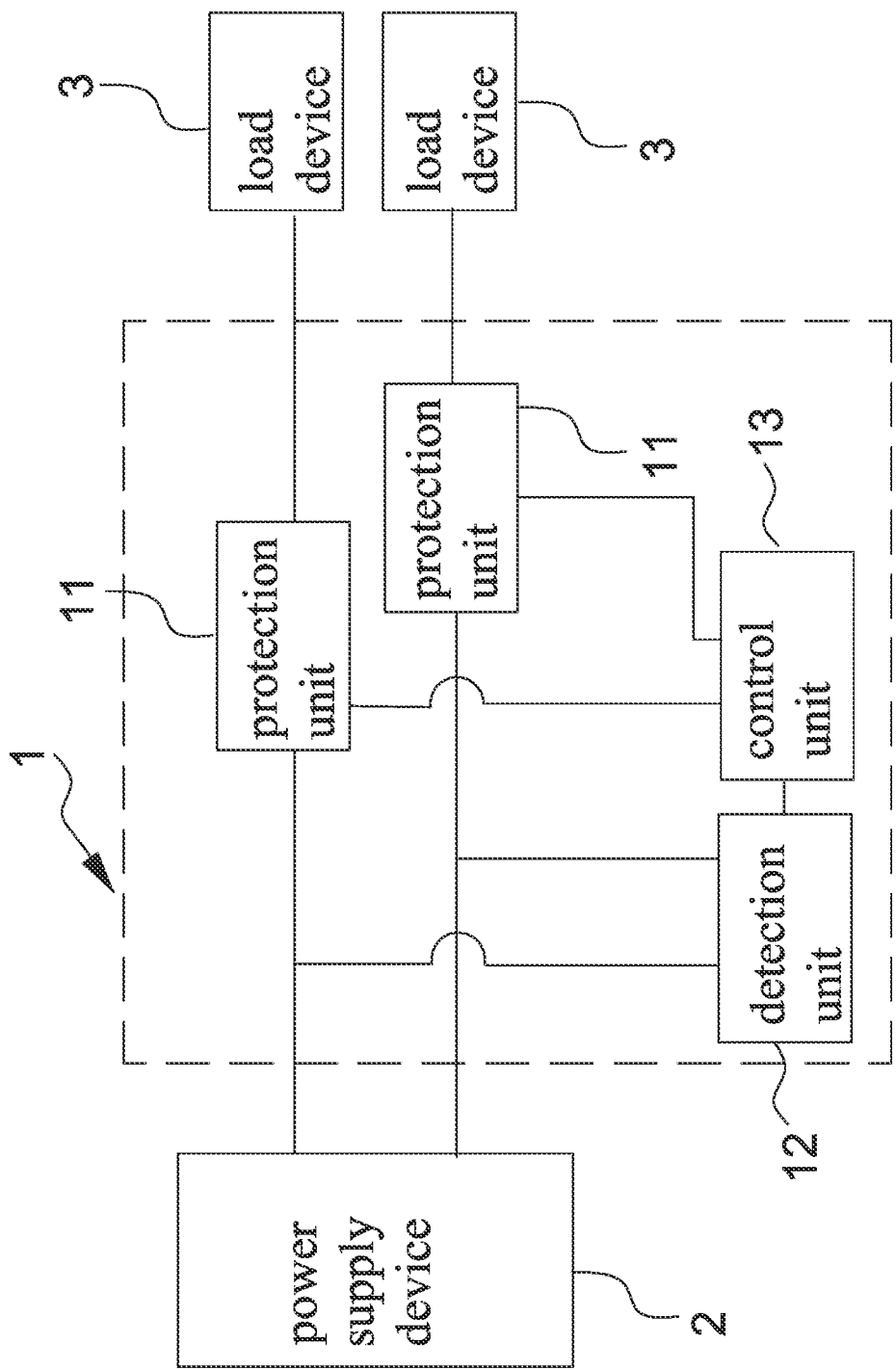
FIG. 6 is a schematic circuit block diagram of a reverse polarity protection device of another embodiment of the present invention.

With reference to FIG. 6 for a schematic circuit block diagram of a reverse polarity protection device of another embodiment of the present invention, the reverse polarity protection device 1 installed on a circuit comprises: at least two protection units 11, each protection unit 11 is electrically coupled between a power supply device 2 and a load device 1 corresponding to the protection unit 11; the power supply device 2 outputs a plurality of output signals respectively to each load device 3 corresponding to each protection unit 11; a detection unit 12, electrically coupled to the power supply device 2, for detecting the polarity of each output signal of the power supply device 2; and a control unit 13, electrically coupled to the detection unit 12 and each protection unit 11; wherein if the detection unit 12 detects that the polarity of any output signal is reverse, the control unit 13 will control the protection unit 11 corresponding to the reverse output signal to form an open circuit between the power supply device 2 and the load device 3 corresponding to the reverse output signal.

wherein each protection unit 11 comprises an n-type MOSFET having a source terminal for receiving the output signal corresponding to the protection unit 11, and a drain terminal and a gate terminal respectively and electrically coupled to the load device 3 corresponding to the protection unit 11 and the control unit 13.

wherein each N-type MOSFET has a source terminal and a drain terminal electrically coupled to the control unit 13.

wherein each protection unit 11 comprises a P-type MOSFET having a source terminal for receiving the output signal corresponding to the protection unit, and a drain terminal and a gate terminal respectively and electrically coupled to the load device 3 corresponding to the protection unit 11 and the control unit 13.

wherein each P-type MOSFET has a source terminal and a drain terminal electrically coupled to the control unit 13.

wherein when the detection unit 12 detects the polarity of each output signal of the power supply device 2, the detection unit 12 outputs a detection signal corresponding to a output signal to the control unit 13, so that if any detection signal corresponding to the protection unit 11 is a low level signal then the control unit 13 will control the protection unit 11 corresponding to the low level signal to form a short circuit between the power supply device 2 and the load device 3 corresponding to the low level signal, and if any detection signal corresponding to the protection unit 11 is a high level signal then the control unit 13 will control the protection unit 11 corresponding to the high level signal to form an open circuit between the power supply device 2 and the load device 3 corresponding to the high level signal.

wherein when the detection unit 12 detects the polarity of each output signal of the power supply device 2, the detection unit 12 outputs a detection signal corresponding to a output signal to the control unit 12, so that if any detection signal corresponding to the protection unit 11 is a high level signal then the control unit 13 will control the protection unit 11 corresponding to the high level signal to form a short circuit between the power supply device 2 and the load device 3 corresponding to the high level signal, and if any detection signal corresponding to the protection unit 11 is a high low signal then the control unit 13 will control the protection unit 11 corresponding to the low level signal to form an open circuit between the power supply device 2 and the load device 3 corresponding to the low level signal.

wherein each output signal is a voltage signal or a current signal.

wherein each load device 3 is one selected from the group consisting of an industrial computer host, a server, a data center host, a desktop computer, a notebook computer, a tablet PC, a smartphone, and a smartwatch.

While the invention has been described by means of specific embodiments, numerous modifications and variations could be made thereto by those skilled in the art without departing from the scope and spirit of the invention set forth in the claims.

What is claimed is:

1. A reverse polarity protection device connected to a power supply device and at least two load devices, comprising:
   at least two protection units, each of the at least two protection units being electrically coupled between the power supply device and corresponding one of the at least two load devices;
   the at least two protection units respectively receiving one of a plurality of output signals from the power supply device and outputting the received one of the plurality of output signals to the corresponding one of the at least two load devices;
   a detection unit, electrically coupled to the power supply device, for detecting a polarity of each of the plurality of output signals of the power supply device; and
   a control unit, electrically coupled to the detection unit and each of the at least two protection units;
   wherein if the detection unit detects that the polarity of one of the plurality of output signals is reversed, the control unit controls a protection unit of the at least two protection units corresponding to the reversed output signal to form an open circuit between the power supply device and a load device of the at least two load devices connected to the protection unit of the at least two protection units corresponding to the reversed output signal,
   wherein when the detection unit detects the polarity of each of the plurality of output signals of the power supply device, the detection unit outputs detection signals each corresponding to a respective one of the plurality of output signals to the control unit, so that if any of the detection signals is a low level signal then the control unit controls the protection unit of the at least two protection units corresponding to the low level signal to form a short circuit between the power supply device and the load device of the at least two load devices corresponding to the low level signal, and if any of the detection signals is a high level signal then the control controls the protection unit of the at least two protection units corresponding to the high level signal to form an open circuit between the power supply device and the load device of the at least two load devices corresponding to the high level signal, and
   wherein each of the plurality of output signals is a voltage signal or a current signal.

2. The reverse polarity protection device of claim 1, wherein each of the at least two protection units comprises an N-type MOSFET having a source terminal for receiving corresponding one of the plurality of output signals, and a drain terminal and a gate terminal respectively and electrically coupled to corresponding one of the at least two load devices and the control unit.

3. The reverse polarity protection device of claim 2, wherein each N-type MOSFET has the source terminal and the drain terminal electrically coupled to the control unit.

4. The reverse polarity protection device of claim 1, wherein each of the at least two protection units comprises a P-type MOSFET having a source terminal for receiving corresponding one of the plurality of output signals, and a drain terminal and a gate terminal respectively and electrically coupled to corresponding one of the at least two load devices and the control unit.

5. The reverse polarity protection device of claim 4, wherein each P-type MOSFET has the source terminal and the drain terminal electrically coupled to the control unit.

6. The reverse polarity protection device of claim 1, wherein each of the at least two load devices is one selected from the group consisting of an industrial computer host, a server, a data center host, a desktop computer, a notebook computer, a tablet PC, a smartphone, and a smartwatch.

7. A reverse polarity protection device connected to a power supply device and at least two load devices, comprising:
   at least two protection units, each of the at least two protection units being electrically coupled between the power supply device and corresponding one of the at least two load devices;
   the at least two protection units respectively receiving one of a plurality of output signals from the power supply device and outputting the received one of the plurality of output signals to the corresponding one of the at least two load devices;
   a detection unit, electrically coupled to the power supply device, for detecting a polarity of each of the plurality of output signals of the power supply device; and
   a control unit, electrically coupled to the detection unit and each of the at least two protection units;
   wherein if the detection unit detects that the polarity of one of the plurality of output signals is reversed, the control unit controls a protection unit of the at least two protection units corresponding to the reversed output signal to form an open circuit between the power supply device and a load device of the at least two load devices connected to the protection unit of the at least two protection units corresponding to the reversed output signal,
   wherein when the detection unit detects the polarity of each of the plurality of output signals of the power supply device, the detection unit outputs detection signals each corresponding to a respective one of the plurality of output signals to the control unit, so that if any of the detection signals is a high level signal then the control unit controls the protection unit of the at least two protection units corresponding to the high level signal to form a short circuit between the power supply device and the load device of the at least two load devices corresponding to the high level signal, and if any of the detection signals is a low signal then the control unit controls the protection unit of the at least two protection units corresponding to the low level signal to form an open circuit between the power supply device and the load device of the at least two load devices corresponding to the low level signal, and
   wherein each of the plurality of output signals is a voltage signal or a current signal.

* * * * *